(12) United States Patent
Adeyemi

(10) Patent No.: US 11,682,963 B1
(45) Date of Patent: Jun. 20, 2023

(54) CURRENT COMBINATION SYSTEM

(71) Applicant: Naval Information Warfare Center, Pacific, San Diego, CA (US)

(72) Inventor: Timi Adeyemi, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/699,533

(22) Filed: Mar. 21, 2022

(51) Int. Cl.
   *H02M 1/10* (2006.01)
   *H02M 1/00* (2006.01)
   *H02M 7/44* (2006.01)

(52) U.S. Cl.
   CPC .......... *H02M 1/0083* (2021.05); *H02M 1/10* (2013.01); *H02M 7/44* (2013.01)

(58) Field of Classification Search
   None
   See application file for complete search history.

(56) References Cited

U.S. PATENT DOCUMENTS

| | | | | |
|---|---|---|---|---|
| 5,012,121 | A * | 4/1991 | Hammond | H02J 9/061 307/64 |
| 6,448,489 | B2 * | 9/2002 | Kimura | H02J 7/35 320/101 |
| 9,563,224 | B2 * | 2/2017 | Saussele | H02J 3/381 |
| 9,660,471 | B2 * | 5/2017 | Adelson | H02J 7/0068 |
| 9,787,170 | B2 * | 10/2017 | Inoue | H02J 3/32 |
| 9,812,984 | B2 * | 11/2017 | Yoscovich | H02J 3/38 |
| 10,389,132 | B2 * | 8/2019 | Cao | F21S 8/085 |
| 11,011,928 | B2 * | 5/2021 | Outlaw | B64D 41/00 |
| 11,239,751 | B2 * | 2/2022 | Teirelbar | H02M 3/156 |

* cited by examiner

*Primary Examiner* — Jeffery S Zweizig
(74) *Attorney, Agent, or Firm* — Naval Information Warfare Center, Pacific; Kyle Eppele; Eric VanWiltenburg

(57) ABSTRACT

The invention relates to a system for combining multiple power sources into a single in-phase AC current and related methods. According to an illustrative embodiment of the present disclosure, multiple out of phase AC power sources are provided, individually converted into DC currents, and combined in parallel to create a single DC current. The single DC current is then converted to an AC current, leaving a single in-phase AC current.

10 Claims, 4 Drawing Sheets

CURRENT COMBINATION SYSTEM

STATEMENT REGARDING FEDERALLY SPONSORED RESEARCH OR DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 112,621.

BACKGROUND OF THE INVENTION

The present invention relates to system for combining multiple input power sources into one output AC power source. The capacity for users to charge alternating current devices is limited to the energy storage of the batteries or the other power sources kept near the batteries, and batteries have limited capacity. Using lithium batteries instead of lead acid can increase capacity but capacity is still limited if the connected load is not properly sized. One method to do this is link the battery voltage in series and using a large inverter to convert the DC voltage to AC. The problem with this method is that the cables needed to combine the voltages would be very bulky and large due to a high current and low voltage. Another method is to locally convert the battery voltages to AC and then combine the voltages together. The problem with this method is that the phases may not match on all the combined input voltages which would cause circulating currents and damage batteries and inverter system.

SUMMARY OF THE INVENTION

According to an illustrative embodiment of the present disclosure, multiple AC power sources are provided, individually converted into DC currents, and combined in parallel to create a single DC current. The single DC current is then converted to an AC current, leaving a single in-phase AC current.

According to a further illustrative embodiment of the present disclosure, multiple DC power sources are provided, individually converted into AC currents, individually converted into DC currents, and combined in parallel to create a single DC current. The single DC current is then converted to an AC current, leaving a single in-phase AC current.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
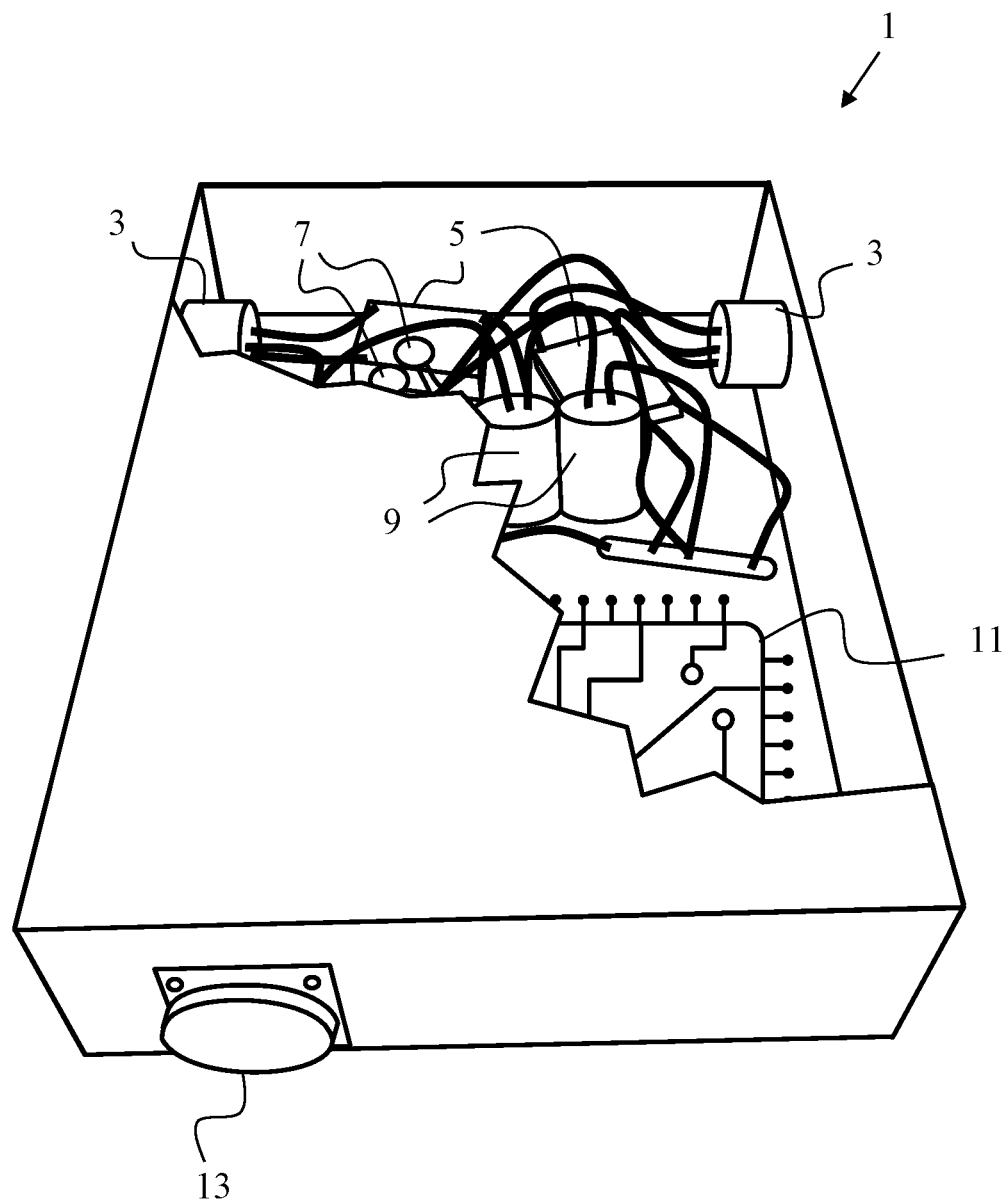
FIG. 1 shows an exemplary current combination system.
Figure 2:
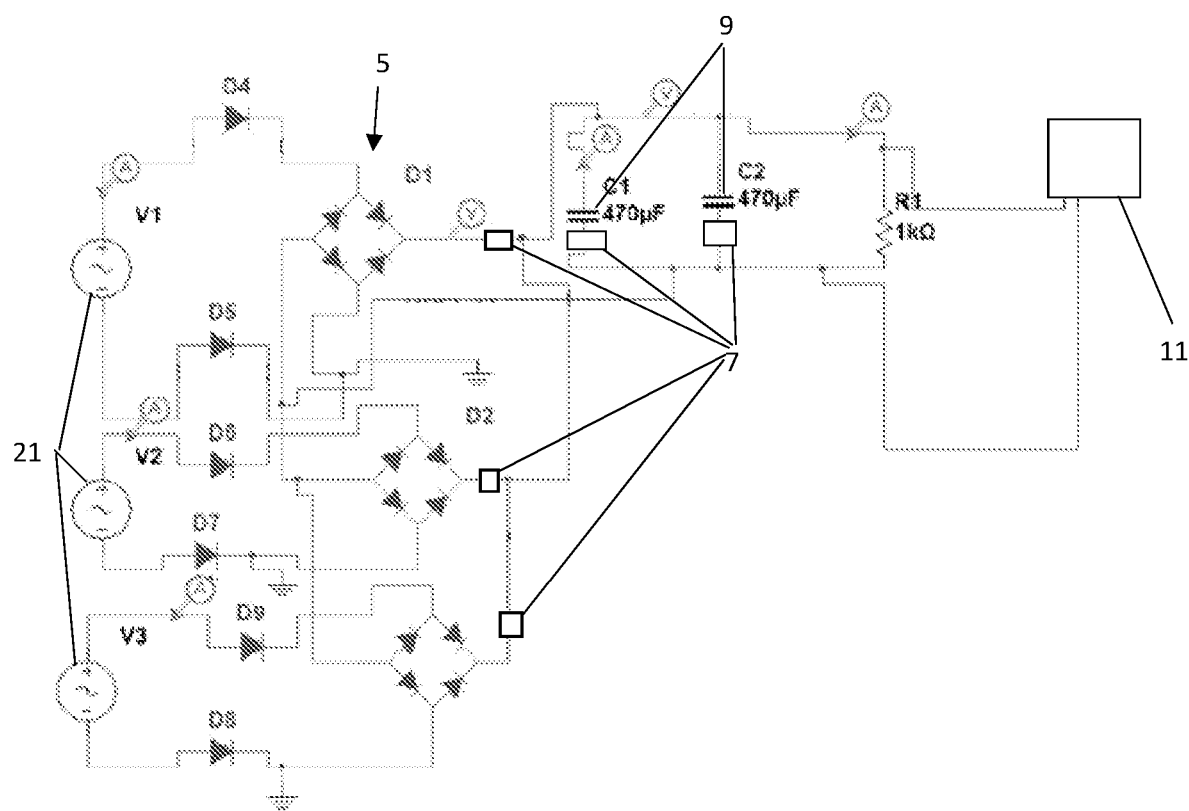
FIG. 2 shows a circuit diagram of an exemplary current combination system.
Figure 3:
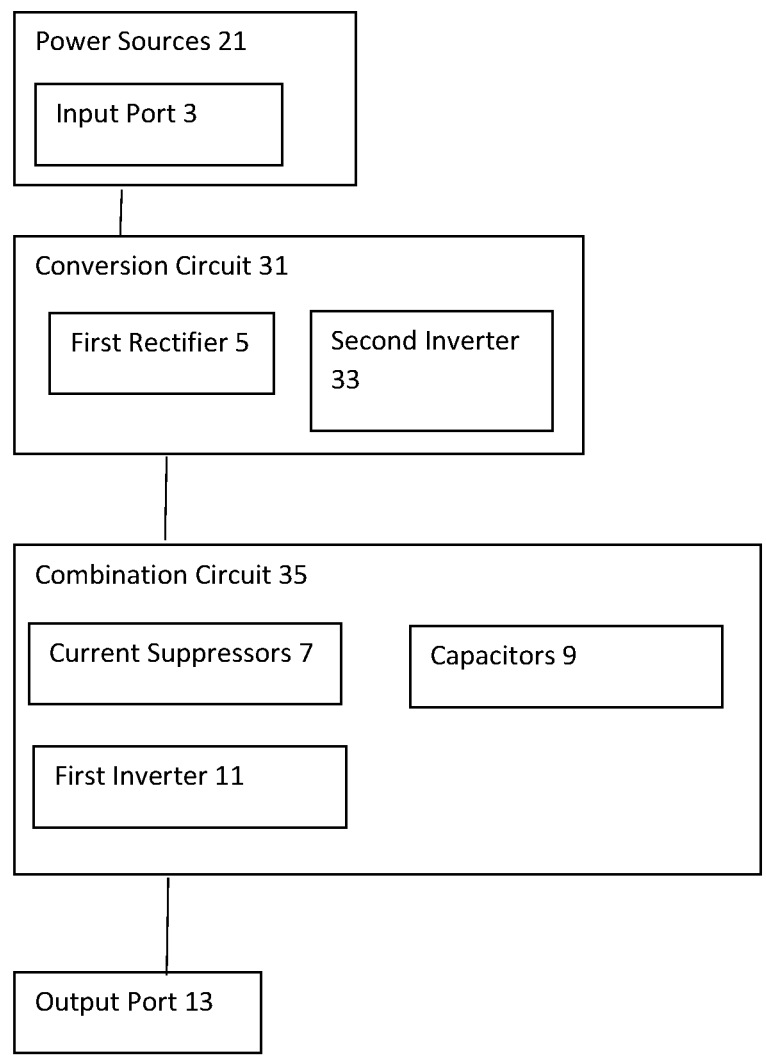
FIG. 3 shows a block diagram of an exemplary current combination system.

FIG. 1 shows an exemplary current combination system 1. Power sources (as shown in FIGS. 2 and 3) can be coupled to the system through power input ports 3. A plurality of first rectifiers are electrically coupled to the power input ports 3. Each power input port is electrically coupled to a single corresponding first rectifier 5 so that the currents from the power sources can be individually converted to DC. Exemplary systems can be scaled to include more first rectifiers 5 and power input ports 3 so that additional power sources can be combined. Current suppressors 7 (e.g., inrush current limiters) are disposed between electrically coupled first rectifiers 5 and capacitors 9. When initially combining the DC currents, large differentials between the currents can result in damage to components. Current suppressors 7 reduce the current of each converted DC output so that the DC outputs at least temporarily have the same voltage. Identical voltages are preferred so that the DC outputs can be combined in a parallel configuration. To minimize losses from using current suppressors, the inversion to DC can be set up to minimize disparities between the DC outputs. At least one capacitor 9 is electrically coupled to first inverter 11, which converts the combined DC outputs to a single in phase AC output that can exit the system through power output port 13.

FIG. 2 shows a circuit diagram of an exemplary current combination system. Power sources 21 are couple to first rectifiers 5. In the shown exemplary system, power sources 21 are AC power sources. Current suppressors 7 reduce the current of each converted DC output so that the DC outputs at least temporarily have the same voltage. In alternative embodiments, DC power sources can be used in conjunction with a plurality of second inverters to convert the DC power sources into AC power sources.

FIG. 3 shows a block diagram of an exemplary current combination system. Power sources 21 include corresponding input ports 3. Power sources 21 are coupled to conversion circuit 31. In embodiments that use DC power source, conversion circuit includes first rectifiers 5 and second inverters 33. In embodiments that use AC power sources, rectification can include only first rectifiers 5. Conversion circuit 31 is coupled to combination circuit 35. Combination circuit 35 can include current suppressors 7, at least one capacitor 9, and first inverter 11. Combination circuit 35 is coupled to output 13.

Figure 4:
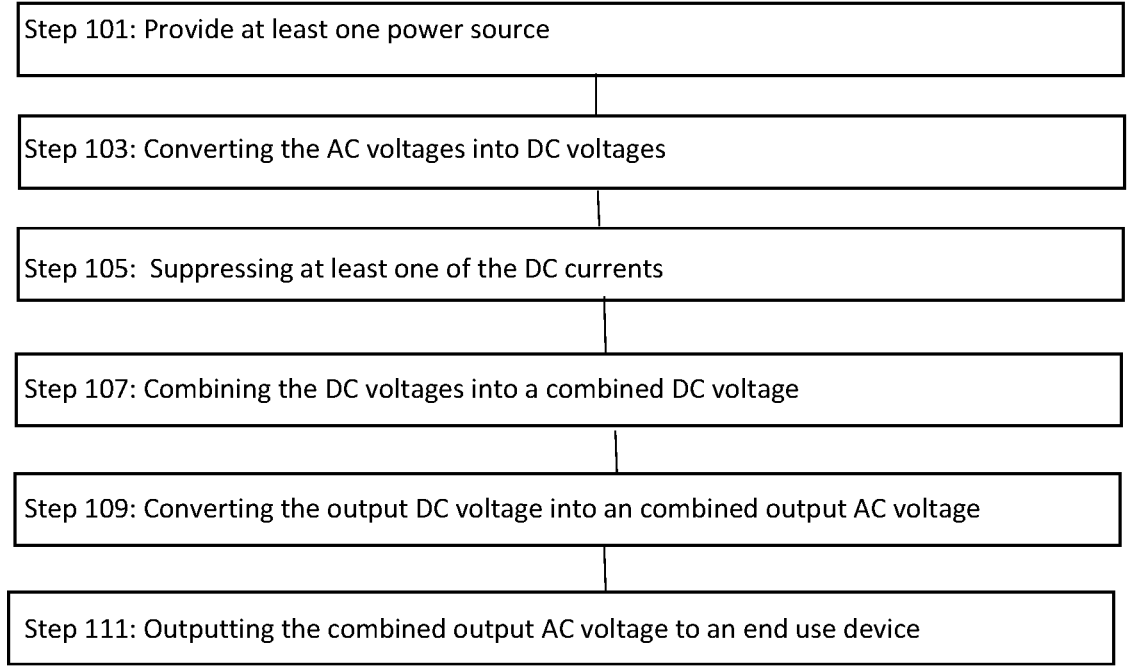
FIG. 4 shows an exemplary method for combining currents.

FIG. 4 shows an exemplary method for combining currents. At step 101: Provide at least one power source. At step 103: Converting the AC voltages into DC voltages. At step 105: Suppressing at least one of the DC currents. At step 107: Combining the DC voltages into a combined DC voltage. At step 109: Converting the output DC voltage into a combined output AC voltage. At step 111: Outputting the combined output AC voltage to an end use device. In alternative embodiments where the power sources are DC voltages, an additional step 102: Converting the DC voltages into AC voltages. Additional step 102 can be used to normalize the voltages prior to step 105 to minimize power loss.

Although the invention has been described in detail with reference to certain preferred embodiments, variations and modifications exist within the spirit and scope of the invention as described and defined in the following claims.

The invention claimed is:

1. A current combination system comprising:
   a plurality of power source input ports;
   an conversion circuit comprising a plurality of first rectifiers, wherein each first rectifier of the plurality of first rectifiers is coupled to a corresponding power source input port of the plurality of power source input ports;
   a combination circuit comprising at least one capacitor and a first inverter, wherein the combination circuit is electrically coupled to the conversion circuit;
   an output port electrically coupled to the combination circuit; and
   at least one current suppression device disposed within the combination circuit such that at least one current of the conversion circuit passes through a corresponding current suppression device of the at least one current suppression device before the combination circuit to limit the current reaching the combination circuit.

2. The system of claim 1, wherein the at least one current suppression device comprises a plurality of current suppression devices such that each current suppression device of the plurality of current suppression devices is coupled to a corresponding first rectifier of the plurality of first rectifiers such that each rectified current passes through a separate current suppression device.

3. The system of claim 1, further comprising a plurality of input power sources electrically coupled to the conversion circuit such that each input power source of the plurality of input power sources is coupled to a corresponding power source input port of the plurality of power source input ports.

4. The system of claim 3, wherein the plurality of input power sources comprises a plurality of AC power sources.

5. The system of claim 4, wherein the at least one current suppression device comprises a plurality of current suppression devices such that each current suppression device of the plurality of current suppression devices is coupled to a corresponding first rectifier of the plurality of first rectifiers such that each rectified current passes through a separate current suppression device.

6. The system of claim 3, wherein the plurality of input power sources comprises a plurality of DC power sources, wherein the conversion circuit further comprises a plurality of second inverters disposed between the plurality of DC power sources and the plurality of first rectifiers, wherein the plurality of second inverters converts the plurality of DC power sources into a plurality of AC power sources.

7. The system of claim 6, wherein the at least one current suppression device comprises a plurality of current suppression devices such that each current suppression device of the plurality of current suppression devices is coupled to a corresponding first rectifier of the plurality of first rectifiers such that each rectified current passes through a separate current suppression device.

8. A method of combining power sources comprising:
   providing a plurality of power sources comprising initial DC voltages or initial AC voltages;
   converting initial DC voltages into converted AC voltages;
   converting initial AC voltages and converted AC voltages into converted DC voltages;
   combining the converted DC voltages into a combined DC voltage;
   converting the output DC voltage into an output AC voltage; and
   outputting the output AC voltage to an end use device.

9. The method of claim 8, further comprising suppressing at least one DC current associated with the converted DC voltages.

10. A method of combining power sources comprising:
    providing current combination system comprising:
       a plurality of power sources;
       a conversion circuit comprising a plurality of first rectifiers;
       a combination circuit comprising at least one capacitor and a first inverter, wherein the combination circuit is electrically coupled to the conversion circuit; and
       an output port electrically coupled to the combination circuit;
    converting initial DC voltages into converted AC voltages;
    converting initial AC voltages and converted AC voltages into converted DC voltages;
    suppressing at least one DC currents associated with the converted DC voltages;
    combining the converted DC voltages into a combined DC voltage;
    converting the output DC voltage into an output AC voltage; and
    outputting the output AC voltage to an end use device.

* * * * *